United States Patent
Agiwal

(10) Patent No.: US 11,419,145 B2
(45) Date of Patent: Aug. 16, 2022

(54) METHOD AND APPARATUS FOR RELEASING PUSCH RESOURCES ASSIGNED FOR RANDOM ACCESS IN WIRELESS COMMUNICATION SYSTEM

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 17/109,599

(22) Filed: Dec. 2, 2020

(65) Prior Publication Data

US 2021/0185724 A1 Jun. 17, 2021

Related U.S. Application Data

(60) Provisional application No. 62/948,363, filed on Dec. 16, 2019.

(51) Int. Cl.
*H04W 74/02* (2009.01)
*H04W 76/36* (2018.01)
(Continued)

(52) U.S. Cl.
CPC ....... *H04W 74/02* (2013.01); *H04W 74/0833* (2013.01); *H04W 76/27* (2018.02); *H04W 76/36* (2018.02)

(58) Field of Classification Search
CPC . H04W 76/27; H04W 76/36; H04W 74/0833; H04W 74/02; H04W 74/006; H04W 76/19
See application file for complete search history.

(56) References Cited

U.S. PATENT DOCUMENTS

2014/0192775 A1\* 7/2014 Li .............. H04W 74/006
370/331
2018/0103465 A1 4/2018 Agiwal et al.
(Continued)

FOREIGN PATENT DOCUMENTS

EP 3 508 020 A2 7/2019
KR 10-2018-0081372 A 7/2018
(Continued)

OTHER PUBLICATIONS

Ericsson, 2-step CFRA, R2-1912681, 3GPP TSG-RAN WG2 RAN2#107bis, Chongqing, China, Oct. 3, 2019, pp. 2, 4-5.
(Continued)

*Primary Examiner* — Anez C Ebrahim
(74) *Attorney, Agent, or Firm* — Jefferson IP Law, LLP

(57) ABSTRACT

A communication method and a system for converging a $5^{th}$-Generation (5G) communication system for supporting higher data rates beyond a $4^{th}$-Generation (4G) system with a technology for Internet of Things (IoT) are provided. The disclosure may be applied to intelligent services based on the 5G communication technology and the IoT-related technology, such as a smart home, a smart building, a smart city, a smart car, a connected car, health care, digital education, a smart retail, security and safety services. The disclosure provides method and an apparatus for releasing physical uplink shared channel (PUSCH) resources assigned for random access procedure.

12 Claims, 7 Drawing Sheets

(51) Int. Cl.
  *H04W 76/27*      (2018.01)
  *H04W 74/08*      (2009.01)

(56) References Cited

U.S. PATENT DOCUMENTS

| | | |
|---|---|---|
| 2018/0205516 A1 | 7/2018 | Jung et al. |
| 2018/0220345 A1 | 8/2018 | Moon et al. |
| 2019/0274169 A1 | 9/2019 | Tsai et al. |
| 2019/0280756 A1* | 9/2019 | Fan .................... H04B 7/0695 |
| 2020/0100297 A1 | 3/2020 | Agiwal et al. |
| 2020/0314913 A1* | 10/2020 | Rastegardoost ...... H04W 74/04 |

FOREIGN PATENT DOCUMENTS

| | | |
|---|---|---|
| KR | 10-2019-0105035 A | 9/2019 |
| WO | 2018/066934 A2 | 4/2018 |
| WO | 2018/175721 A1 | 9/2018 |

OTHER PUBLICATIONS

Huawei et al., Discussion on the msgA transmission, R2-1913008, 3GPP TSG-RAN WG2 #107bis, Chongqing, China, Oct. 3, 2019, p. 2.
International Search Report dated Mar. 15, 2021, issued in International Application No. PCT/KR2020/017407.
Nokia et al., CFRA resource handling for BFR upon TAT expiry, 3GPP TSG-RAN WG2 Meeting #108, R2-1915333, Nov. 8, 2019, Reno, USA, XP051817167.
European Search Report dated Dec. 14, 2021, issued in European Application No. 20870436.1.

\* cited by examiner

METHOD AND APPARATUS FOR RELEASING PUSCH RESOURCES ASSIGNED FOR RANDOM ACCESS IN WIRELESS COMMUNICATION SYSTEM

CROSS-REFERENCE TO RELATED APPLICATION(S)

This application is based on and claims priority under 35 U.S.C. § 119(e) of a U.S. provisional patent application Ser. No. 62/948,363, filed on Dec. 16, 2019, in the U.S. Patent and Trademark Office, the disclosure of which is incorporated by reference herein in its entirety.

BACKGROUND

1. Field

The disclosure relates to a wireless communication system. More particularly, the disclosure relates to an apparatus, a method and a system for releasing physical uplink shared channel (PUSCH) resource assigned for random access in wireless communication system.

2. Description of Related Art

To meet the demand for wireless data traffic having increased since deployment of $4^{th}$ Generation (4G) communication systems, efforts have been made to develop an improved $5^{th}$ Generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-Points (CoMP), reception-end interference cancellation, and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

Recently, there are needs to enhance current random access procedure for next generation wireless communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a $5^{th}$ generation (5G) communication system for supporting higher data rates beyond a $6^{th}$ generation (4G).

Additional aspects will be set forth in part in the description which follows and, in part, will be apparent from the description, or may be learned by practice of the presented embodiments.

In accordance with an aspect of the disclosure, a method performed by a terminal is provided. The method includes receiving, from a base station, a message including information configuring a contention free random access resource for 2-step random access procedure, transmitting, to the base station, a message A (MSGA) preamble for the 2-step random access procedure, identifying, in case that a criteria for the 2-step random access procedure completion is not met, whether a parameter associated with a maximum number of MSGA transmission is configured and a number of transmissions of the MSGA equals the parameter, and releasing the contention free random access resource configured based on the information, in case that the number of transmissions of the MSGA equals the parameter.

In accordance with another aspect of the disclosure, a method performed by a base station is provided. The method includes transmitting, to a terminal, a message including information configuring a contention free random access resource for 2-step random access procedure, receiving, from the terminal, a message A (MSGA) preamble for the 2-step random access procedure, and transmitting, to the terminal, a message in response to the MSGA preamble, wherein, in case that the 2-step random access procedure is not completed, whether a parameter associated with a maximum number of MSGA transmission is configured for the terminal and a number of transmissions of the MSGA equals the parameter is identified, and wherein the contention free random access resource configured based on the information is released, in case that the number of transmissions of the MSGA equals the parameter.

In accordance with another aspect of the disclosure, a terminal is provided. The terminal includes a transceiver configured to transmit and receive a signal, and a controller configured to receive, from a base station, a message including information configuring a contention free random access resource for 2-step random access procedure, transmit, to the base station, a message A (MSGA) preamble for the 2-step random access procedure, identify, in case that a criteria for the 2-step random access procedure completion is not met, whether a parameter associated with a maximum number of MSGA transmission is configured and a number of transmissions of the MSGA equals the parameter, and release the contention free random access resource configured based on the information, in case that the number of transmissions of the MSGA equals the parameter.

In accordance with another aspect of the disclosure, a base station is provided. The base station includes a transceiver configured to transmit and receive a signal, and a controller configured to transmit, to a terminal, a message including information configuring a contention free random access resource for 2-step random access procedure, receive, from the terminal, a message A (MSGA) preamble for the 2-step random access procedure, and transmit, to the terminal, a message in response to the MSGA preamble, wherein, in case that the 2-step random access procedure is not completed, whether a parameter associated with a maximum number of MSGA transmission is configured for the terminal and a number of transmissions of the MSGA equals the parameter is identified, and wherein the contention free random access resource configured based on the information is released, in case that the number of transmissions of the MSGA equals the parameter.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
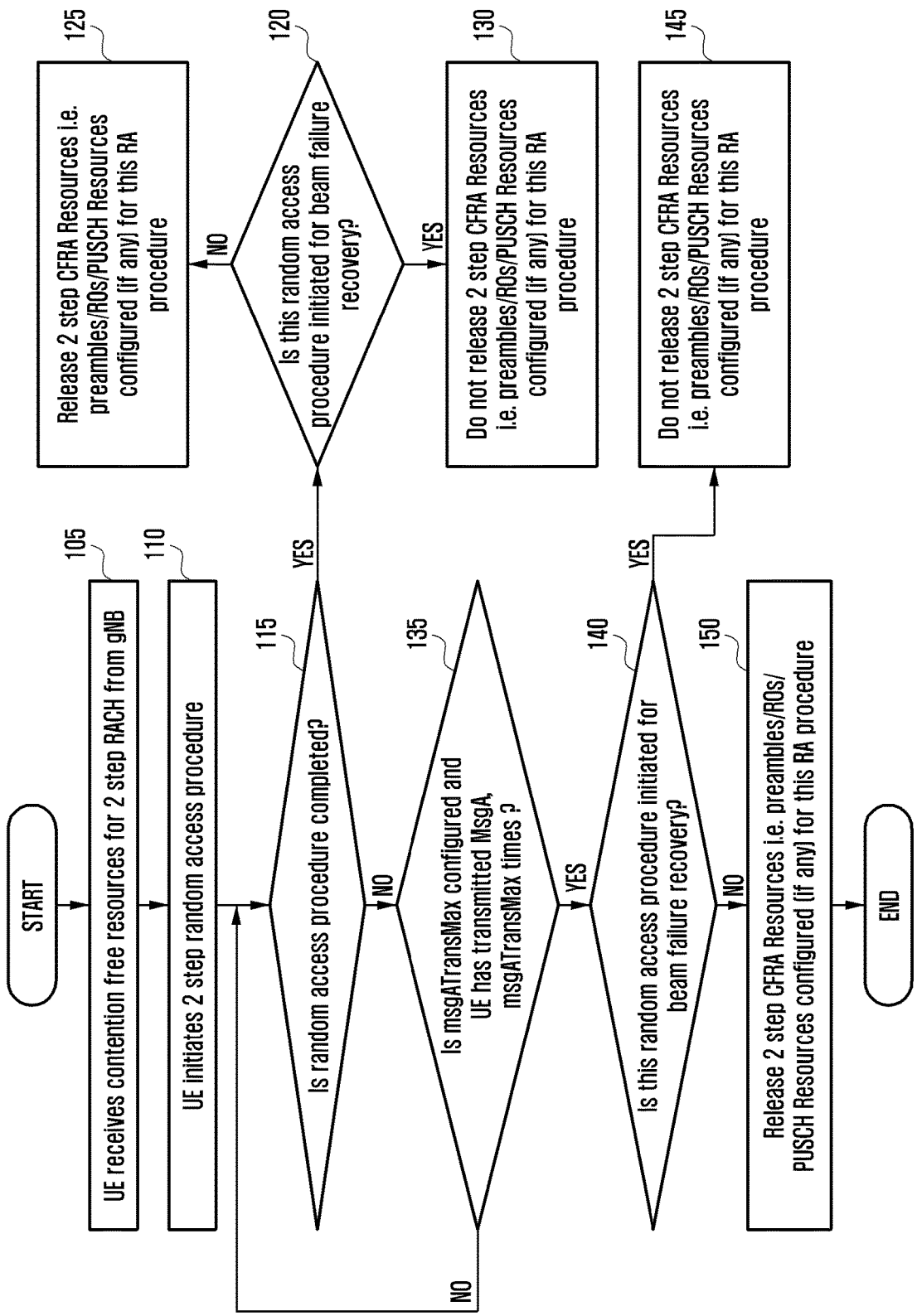
FIG. 1 illustrates a flowchart of releasing random access resources according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB (next generation node B).

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. 3G wireless communication system supports not only the voice service but also data service. In recent years, the fourth wireless communication system has been developed to provide high-speed data service. However, currently, the 4G wireless communication system suffers from lack of resources to meet the growing demand for high speed data services. Accordingly, a 5G wireless communication system (also referred as next generation radio or NR) is being developed to meet the growing demand for high speed data services, support ultra-reliability and low latency applications.

The 5G wireless communication system supports not only lower frequency bands but also in higher frequency (mm-Wave) bands, e.g., 10 GHz to 100 GHz bands, so as to accomplish higher data rates. To mitigate propagation loss of the radio waves and increase the transmission distance, the beamforming, massive MIMO, FD-MIMO, array antenna, an analog beam forming, large scale antenna techniques are being considered in the design of 5G wireless communication system. In addition, the 5G wireless communication system is expected to address different use cases having quite different requirements in terms of data rate, latency, reliability, mobility, or the like.

However, it is expected that the design of the air-interface of the 5G wireless communication system would be flexible enough to serve the UEs having quite different capabilities depending on the use case and market segment the UE cater service to the end customer. Few example use cases the 5G wireless communication system wireless system is expected to address is enhanced mobile broadband (eMBB), massive machine type communication (m-MTC), ultra-reliable low latency communication (URLL), or the like. The eMBB requirements like tens of Gbps data rate, low latency, high mobility so on and so forth address the market segment representing the wireless broadband subscribers of the related art needing internet connectivity everywhere, all the time and on the go. The m-MTC requirements like very high connection density, infrequent data transmission, very long battery life, low mobility address so on and so forth address the market segment representing the Internet of Things (IoT)/Internet of everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the 5G wireless communication system operating in higher frequency (e.g., mmWave) bands, UE and gNB communicates with each other using Beamforming Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms, such as a linear array, a planar array, or the like. The use of the TX beamforming results in the increase in the directivity of a signal, thereby increasing a propagation distance. Further, since the signal is almost not transmitted in a direction other than a directivity direction, a signal interference acting on another receiving end is significantly decreased.

The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming A receiver can also make plurality of receive (RX) beam patterns of different directions. Each of these receive patterns can be also referred as receive (RX) beam.

The 5G wireless communication system, supports standalone mode of operation as well dual connectivity (DC). In DC a multiple Rx/Tx UE may be configured to utilize resources provided by two different nodes (or NBs) connected via non-ideal backhaul. One node acts as the master node (MN) and the other as the secondary node (SN). The MN and SN are connected via a network interface and at least the MN is connected to the core network. NR also supports multi-RAT dual connectivity (MR-DC) operation whereby a UE in radio resource control connected (RRC_CONNECTED) is configured to utilize radio resources provided by two distinct schedulers, located in two different nodes connected via a non-ideal backhaul and providing either evolved universal mobile telecommunications System (UMTS) terrestrial radio access (E-UTRA (i.e., if the node is an ng-eNB)) or NR access (i.e., if the node is a gNB). In NR for a UE in RRC_CONNECTED not configured with carrier aggregation (CA)/DC, there is only one serving cell comprising of the primary cell. For a UE in RRC_CONNECTED configured with CA/DC the term 'serving cells' is used to denote the set of cells comprising of the Special Cell(s) and all secondary cells. In NR the term master cell group (MCG) refers to a group of serving cells associated with the Master Node, comprising of the primary cell (PCell) and optionally one or more secondary cells (SCells). In NR the term secondary cell group (SCG) refers to a group of serving cells associated with the Secondary Node, comprising of the primary SCG cell (PSCell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, SCell is a cell providing additional radio resources on top of Special Cell. PSCell refers to a serving cell in SCG in which the UE performs random access when performing the Reconfiguration with Sync procedure. For Dual Connectivity operation the term SpCell (i.e., a Special Cell) refers to the PCell of the MCG or the PSCell of the SCG, otherwise the term Special Cell refers to the PCell.

In the 5G wireless communication system, node B (or gNB) or base station in cell broadcast Synchronization Signal and physical broadcast channel (PBCH) block (i.e., a synchronization signal/PBCH block (SSB)) consists of primary and secondary synchronization signals (PSS, SSS) and system information. System information includes common parameters needed to communicate in cell. In the 5G wireless communication system (also referred as next generation radio or NR), system information (SI) is divided into the master information block (MIB) and a number of system information blocks (SIBs) where:

the MIB is always transmitted on the PBCH with a periodicity of 80 ms and repetitions made within 80 ms and it includes parameters that are needed to acquire SIB1 from the cell.

the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g., mapping of SIBs to SI message, periodicity, SI-window size) of other SIBs with an indication whether one or more SIBs are only provided on-demand and, in that case, the configuration needed by the UE to perform the SI request. SIB1 is cell-specific SIB.

SIBs other than SIB1 are carried in system information (SI) messages, which are transmitted on the DL-SCH. Only SIBs having the same periodicity can be mapped to the same SI message.

In the 5G wireless communication system, physical downlink control channel (PDCCH) is used to schedule downlink (DL) transmissions on physical downlink shared channel (PDSCH) and uplink (UL) transmissions on physical uplink shared channel (PUSCH), where the downlink control information (DCI) on PDCCH includes Downlink assignments containing at least modulation and coding format, resource allocation, and hybrid-automatic repeat request (ARQ) information related to DL-SCH, Uplink scheduling grants containing at least modulation and coding format, resource allocation, and hybrid-ARQ information related to UL-SCH. In addition to scheduling, PDCCH can be used to for activation and deactivation of configured PUSCH transmission with configured grant, Activation and deactivation of PDSCH semi-persistent transmission, Notifying one or more UEs of the slot format, Notifying one or more UEs of the physical resource block(s) (PRB(s)) and orthogonal frequency division multiplexing (OFDM) symbol(s) where the UE may assume no transmission is intended for the UE, transmission of transmission power command (TPC) commands for physical uplink control channel (PUCCH) and PUSCH, Transmission of one or more TPC commands for sounding reference signal (SRS) transmissions by one or more UEs, Switching a UE's active bandwidth part, Initiating a random access procedure. A UE monitors a set of PDCCH candidates in the configured monitoring occasions in one or more configured control resource SETs (CORESETs) according to the corresponding search space configurations. A CORESET consists of a set of PRBs with a time duration of 1 to 3 OFDM symbols. The resource units resource element groups (REGs) and control channel elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. quadrature phase shift keying (QPSK) modulation is used for PDCCH.

In 5G wireless communication system, a list of search space configurations is signaled by GNB for each configured BWP wherein each search configuration is uniquely identified by an identifier. Identifier of search space configuration to be used for specific purpose, such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the Equation 1 below:

$$(y*(\text{number of slots in a radio frame})+x-\text{Monitoring-offset-PDCCH-slot}) \bmod (\text{Monitoring-periodicity-PDCCH-slot})=0, \quad \text{Equation 1}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of coreset configuration associated with it. A list of coreset configurations are signaled by GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each coreset configuration is associated with a list of transmission configuration indicator (TCI) states. One DL reference signal (RS) ID (either SSB or channel state information RS (CSI-RS)) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is quasi-collocated (QCLed) with SSB/CSI-RS of TCI state) used by GNB for transmission of PDCCH in the PDCCH monitoring occasions of a search space.

In 5G wireless communication system bandwidth adaptation (BA) is supported. With BA, the receive and transmit bandwidth of a UE need not be as large as the bandwidth of the cell and can be adjusted: the width can be ordered to change (e.g., to shrink during period of low activity to save power), the location can move in the frequency domain (e.g., to increase scheduling flexibility), and the subcarrier spacing can be ordered to change (e.g., to allow different services). A subset of the total cell bandwidth of a cell is referred to as a bandwidth part (BWP). BA is achieved by configuring RRC connected UE with BWP(s) and telling the UE which of the configured BWPs is currently the active one. When BA is configured, the UE only has to monitor PDCCH on the one active BWP i.e., it does not have to monitor PDCCH on the entire DL frequency of the serving cell. In RRC connected state, UE is configured with one or more DL and UL BWPs, for each configured Serving Cell (i.e., PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the medium access control (MAC) entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve UL time synchronization. RA is used during initial access, handover, RRC connection re-establishment procedure, scheduling request transmission, SCG addition/modification, beam failure recovery and data or control information transmission in UL by non-synchronized UE in RRC CONNECTED state. Several types of random access procedure are supported.

Contention based random access (CBRA). This is also referred as 4 step CBRA. In this type of random access, UE first transmits random access preamble (also referred as Msg1) and then waits for random access response (RAR) in the RAR window. RAR is also referred as Msg2. Next generation node B (gNB) transmits the RAR on PDSCH. PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+ 14*t_id+14*80*f_id+14*80*8*ul_carrier_id, where s_id is the index of the first OFDM symbol of the PRACH occasion where UE has transmitted Msg1, i.e., RA preamble, $0 \leq s\_id < 14$, t_id is the index of the first slot of the PRACH occasion ($0 \leq t\_id < 80$), f_id is the index of the PRACH occasion within the slot in the frequency domain ($0 \leq f\_id < 8$), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR MAC protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e., select random access resource (preamble/ RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message, such as RRC connection request, RRC connection re-establishment request, RRC handover confirm, scheduling request, SI request, or the like. It may include the UE identity (i.e., cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a PDCCH addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e., select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios, such as handover where low latency is required, timing advance establishment for SCell, or the like. Evolved node B (or gNB) assigns to UE dedicated Random access preamble. UE transmits the dedicated RA preamble. ENB (or gNB) transmits the RAR on PDSCH addressed to RA-RNTI. RAR conveys RA preamble identifier and timing alignment information. RAR may also include UL grant. RAR is transmitted in RAR window similar to CBRA procedure. CFRA is considered successfully completed after receiving the RAR including RAPID of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e., during random access resource selection for Msg1 transmission, UE determines whether to transmit dedicated preamble or non-dedicated preamble. Dedicated preambles is typically provided for a subset of SSBs/CSI-RSs. If there is no SSB/CSI RS having DL reference signal received power (RSRP) above a threshold amongst the SSBs/CSI-RSs for which contention free random access resources (i.e., dedicated preambles/ROs) are provided by gNB, UE select non dedicated preamble. Otherwise UE select dedicated preamble. Accordingly, during the RA procedure, one random access attempt can be CFRA while other random access attempt can be CBRA.

2 step contention based random access (2 step CBRA): In the first step, UE transmits random access preamble on PRACH and a payload (i.e., a MAC PDU) on PUSCH. The random access preamble and payload transmission is also referred as MsgA. In the second step, after MsgA transmission, the UE monitors for a response from the network (i.e., gNB) within a configured window. The response is also referred as MsgB. If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e., upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the MsgA configurable number of times, UE fallbacks to 4 step RACH procedure i.e., UE only transmits the PRACH preamble.

MsgA payload may include one or more of CCCH SDU, dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MsgA may include UE ID (e.g., random ID, S-TMSI, C-RNTI, resume ID, or the like) along with preamble in first step. The UE ID may be included in the MAC PDU of the MsgA. UE ID, such as C-RNTI may be carried in MAC CE wherein MAC CE is included in MAC PDU. Other UE IDs (such random ID, S-TMSI, C-RNTI, resume ID, or the like) may be carried in CCCH SDU. The UE ID can be one of random ID, S-TMSI, C-RNTI, resume ID, IMSI, idle mode ID, inactive mode ID, or the like. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g., in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/BS/transmission and reception point (TRP) switching indication, connection re-establishment indication, reconfiguration complete or handover complete message, or the like.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e., dedicated preamble/PUSCH resource/RO). In the second step, after MsgA transmission, the UE monitors for a response from the network (i.e., a gNB) within a configured window. If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e., during random access resource selection for MsgA transmission UE determines whether to transmit dedicated preamble or non-dedicated preamble. Dedicated preambles are typically provided for a subset of SSBs/CSI-RSs. If there is no SSB/CSI-RS having DL RSRP above a threshold amongst the SSBs/CSI RSs for which contention free random access resources (i.e., dedicated preambles/ROs/ PUSCH resources) are provided by gNB, UE select non dedicated preamble. Otherwise UE select dedicated preamble. So during the RA procedure, one random access attempt can be 2 step CFRA while other random access attempt can be 2 step CBRA.

Meanwhile, in the legacy CFRA procedure, upon completion of random access procedure the MAC entity discards explicitly signaled contention free random access resources (i.e., preambles and RACH occasions dedicatedly assigned to UE by gNB). In 2 step CFRA, PUSCH resource(s) are also assigned to UE in addition to preambles and RACH occasions. The criteria for releasing the PUSCH resource(s) dedicatedly assigned to UE for 2 step CFRA is not defined. As a result, once the resource(s) are assigned, network cannot reuse these unless explicitly released by network. The explicit release indication from network is unnecessary and some criteria for implicitly releasing the PUSCH resource(s) dedicatedly assigned to UE for 2 step CFRA is needed.

Embodiment 1-1

FIG. 1 illustrates a flowchart of releasing contention free random access resources for 2 step RACH according to an embodiment of the disclosure.

Referring to FIG. 1, a UE receives contention free resources for 2 step RACH from gNB at operation 105. For example, during handover or reconfiguration with sync, UE receives contention free resources (i.e., dedicated random access preamble(s), dedicated RACH resources or occasions (ROs), dedicated PUSCH resources or Occasions) for 2 step RACH from gNB in RRC reconfiguration message. UE initiates 2 step random access procedure wherein contention free resources for 2 step RACH are applied to this random access procedure at operation 110.

During random access resource selection for MsgA transmission, UE determines whether to transmit MsgA using contention free resources or not. Dedicated (i.e., a contention free) resources are typically provided for a subset of SSBs/CSI-RSs. If there is no SSB/CSI-RS having DL RSRP above a threshold amongst the SSBs/CSI-RSs for which contention free random access resources (i.e., dedicated preambles/ROs/PUSCH resources) are provided by gNB, UE select non-dedicated resources. Otherwise UE select dedicated resources. Accordingly, during the RA procedure, one random access attempt can be 2 step CFRA while other random access attempt can be 2 step CBRA.

During the random access procedure, if the criteria for random access procedure completion is met and this random access procedure is not initiated for beam failure recovery at operations 115 and 120, UE releases the 2 step CFRA resources (random access preamble(s), RACH occasions, PUSCH resources) configured (if any) for this random access procedure at operation 125. Release means that UE will not use these resources for subsequent random access procedure. If the criteria for random access procedure completion is met and this random access procedure is initiated for beam failure recovery at operations 115 and 120, UE does not release the 2 step CFRA resources configured (if any) for this random access procedure at operation 130. The various criteria for random access procedure completion are as follows:

- For random access procedure initiated for BFR, after transmitting the MsgA including C-RNTI, if UE receives PDCCH addressed to C-RNTI in MsgB Response window random access procedure is considered completed.
- For random access procedure initiated for events other than BFR, after transmitting the MsgA including C-RNTI, if UE receives PDCCH addressed to C-RNTI in MsgB Response window and this PDCCH contains UL grant for new transmission and if TAT timer associated with PTAG is running, random access procedure is considered completed
- For random access procedure initiated for events other than BFR, after transmitting the MsgA including C-RNTI, if TAT timer associated with PTAG is not running and if UE receives PDCCH addressed to C-RNTI in MsgB Response window and DL TB scheduled by this PDCCH includes Absolute timing advanced command MAC CE, random access procedure is considered completed
- After transmitting the MsgA, UE receives PDCCH addressed to MSGB-RNTI in MsgB Response window and decoded TB includes fallback RAR MAC subPDU wherein the RAPID in fallback RAR matches the preamble index of random access preamble transmitted by UE and this random access preamble is contention free random access preamble, random access procedure is considered completed
- After transmitting Msg3 (in the UL grant received in fallback RAR wherein the RAPID in fallback RAR matches the preamble index of random access preamble transmitted by UE and this random access preamble is contention based random access preamble), if contention resolution is successful, random access procedure is considered completed.
- If the Random Access procedure was initiated for beam failure recovery and the UE receives PDCCH transmission addressed to the C-RNTI, or if the Random Access procedure was initiated by a PDCCH order and the UE receives PDCCH transmission addressed to the C-RNTI, or if the Random Access procedure was initiated by the MAC sublayer itself or by the RRC sublayer and the UE receives PDCCH transmission addressed to the C-RNTI and contains a UL grant for a new transmission: Contention Resolution is successful.

If the criteria for random access procedure completion is not met at operation 115 and if the parameter msgATransMax is configured by GNB (i.e., msgATransMax is signaled by gNB along with 2 step CFRA resources) and if UE has transmitted MsgA msgATransMax times at operation 135 and this random access procedure is not initiated for beam failure recovery at operation 140, UE releases the 2 step CFRA resources (random access preamble(s), RACH occasions, PUSCH resources) configured (if any) for this random access procedure at operation 150. If this random access procedure is initiated for beam failure recovery at operation 140, UE does not release 2 step CFRA resources (random access preamble(s), RACH occasions, PUSCH resources) configured (if any) for this random access procedure at operation 145. It is to be noted that parameter msgATransMax is different from preambleTransMax. if msgB-ResponseWindow expires and if UE has transmitted Preamble, preambleTransMax times, random access problem is indicated to RRC. In case the random access procedure is initiated for SI request, if msgB-ResponseWindow expires and if UE has transmitted Preamble, random access procedure is also considered unsuccessfully completed.

Embodiment 1-2

Figure 2:
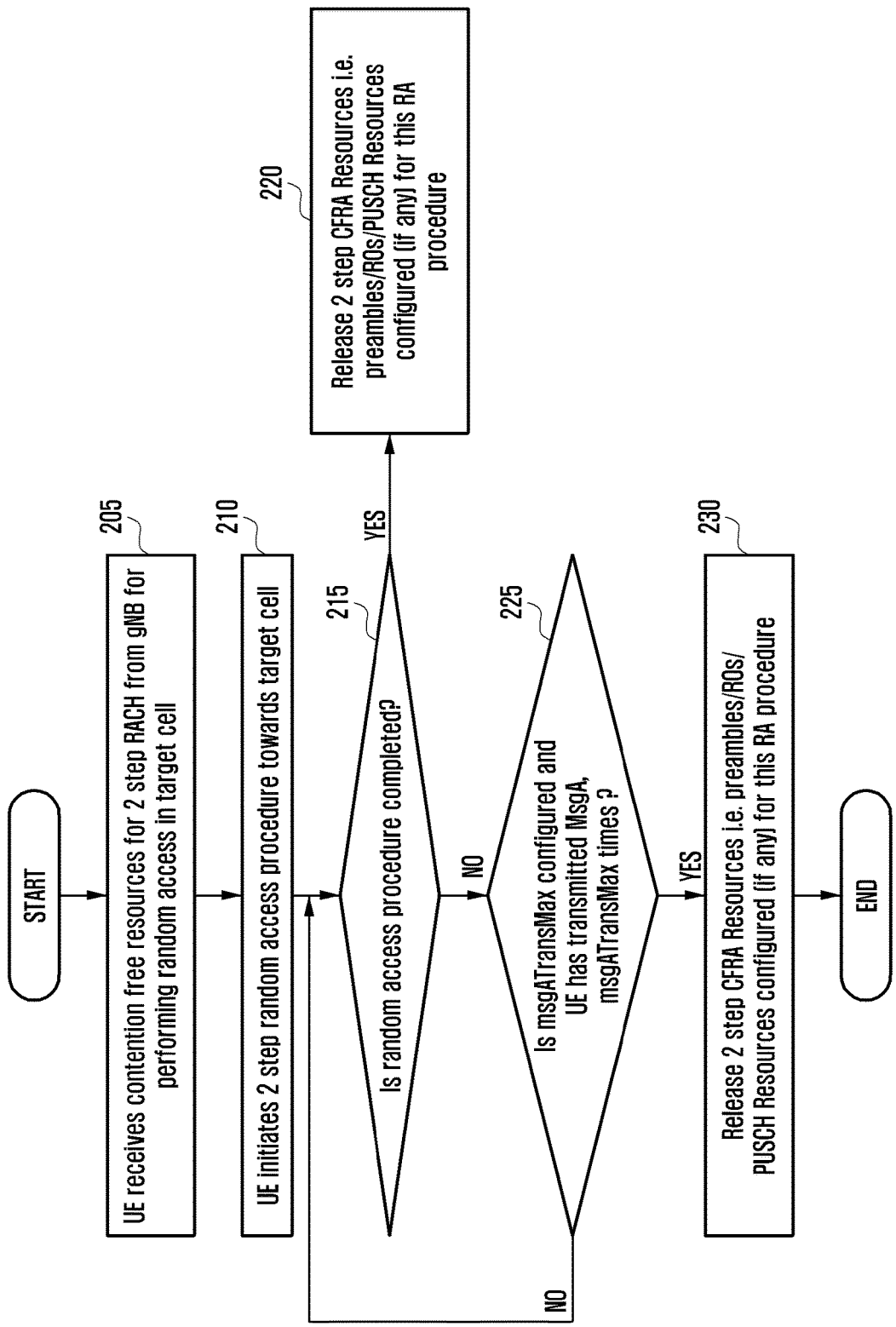
FIG. 2 illustrates a flowchart of releasing random access resources according to an embodiment of the disclosure.

FIG. 2 illustrates a flowchart of releasing contention free random access resources for 2 step RACH according to an embodiment of the disclosure.

Referring to FIG. 2, a UE receives contention free resources for 2 step RACH from gNB during handover or reconfiguration with sync at operation 205. UE receives contention free resources (i.e., dedicated random access preamble(s), dedicated RACH resources or occasions, dedicated PUSCH resources or occasions) for 2 step RACH from gNB in RRC reconfiguration message. UE initiates 2 step random access procedure wherein contention free resources for 2 step RACH are applied to this random access procedure at operation 210.

During random access resource selection for MsgA transmission, UE determines whether to transmit MsgA using contention free resources or not. Dedicated (i.e., a contention free) resources are typically provided for a subset of SSBs/CSI-RSs. If there is no SSB/CSI-RS having DL RSRP above a threshold amongst the SSBs/CSI-RSs for which contention free random access resources (i.e., dedicated preambles/ROs/PUSCH resources) are provided by gNB, UE select non dedicated resources. Otherwise UE select dedicated resources. Accordingly, during the RA procedure, one random access attempt can be 2 step CFRA while other random access attempt can be 2 step CBRA.

During the random access procedure, if the criteria for random access procedure completion is met at operation 215, UE releases the 2 step CFRA resources (random access preamble(s), RACH occasions, PUSCH resources or occasions) configured (if any) for this random access procedure at operation 220. Release means that UE will not use these resources for subsequent random access procedure. The various criteria for random access procedure completion are as follows:

This random access procedure is initiated for handover/reconfiguration with sync. C-RNTI is included in MsgA. TAT timer associated with PTAG is not running. After transmitting the MsgA including C-RNTI, if UE receives PDCCH addressed to C-RNTI in MsgB Response window and DL TB scheduled by this PDCCH includes Absolute timing advanced command MAC CE (it includes full 12 bit TA), random access procedure is considered completed.

After transmitting the MsgA, UE receives PDCCH addressed to MSGB-RNTI in MsgB Response window and decoded TB includes fallback RAR MAC subPDU wherein the RAPID in fallback RAR matches the preamble index of random access preamble transmitted by UE and this random access preamble is contention free random access preamble, random access procedure is considered completed After transmitting Msg3 (in the UL grant received in fallback RAR wherein the RAPID in fallback RAR matches the preamble index of random access preamble transmitted by UE and this random access preamble is contention based random access preamble), if contention resolution is successful, random access procedure is considered completed.

UE receives PDCCH transmission addressed to the C-RNTI and this PDCCH contains a UL grant for a new transmission: Contention Resolution is successful, If the criteria for random access procedure completion is not met at operation 215 and if the parameter msgATransMax is configured by GNB (i.e., msgATransMax is signaled by gNB along with 2 step CFRA resources) and if UE has transmitted MsgA msgATransMax times at operation 225, UE releases the 2 step CFRA resources (random access preamble(s), RACH occasions, PUSCH resources) configured (if any) for this random access procedure at operation 230. Release here means that UE will not use these resources for remaining random access attempts for this random access procedure and will not use these resources for subsequent random access procedure. UE continues the RA procedure using 4 step RA resources. If 4 step CFRA resources are configured, these will be released when RA procedure is completed. It is to be noted that parameter msgATransMax is different from preambleTransMax. if msgB-ResponseWindow expires and if UE has transmitted Preamble, preambleTransMax times, random access problem is indicated to RRC. In case the random access procedure is initiated for SI request, if msgB-ResponseWindow expires and if UE has transmitted Preamble, random access procedure is also considered unsuccessfully completed.

Embodiment 1-3

Figure 3A:
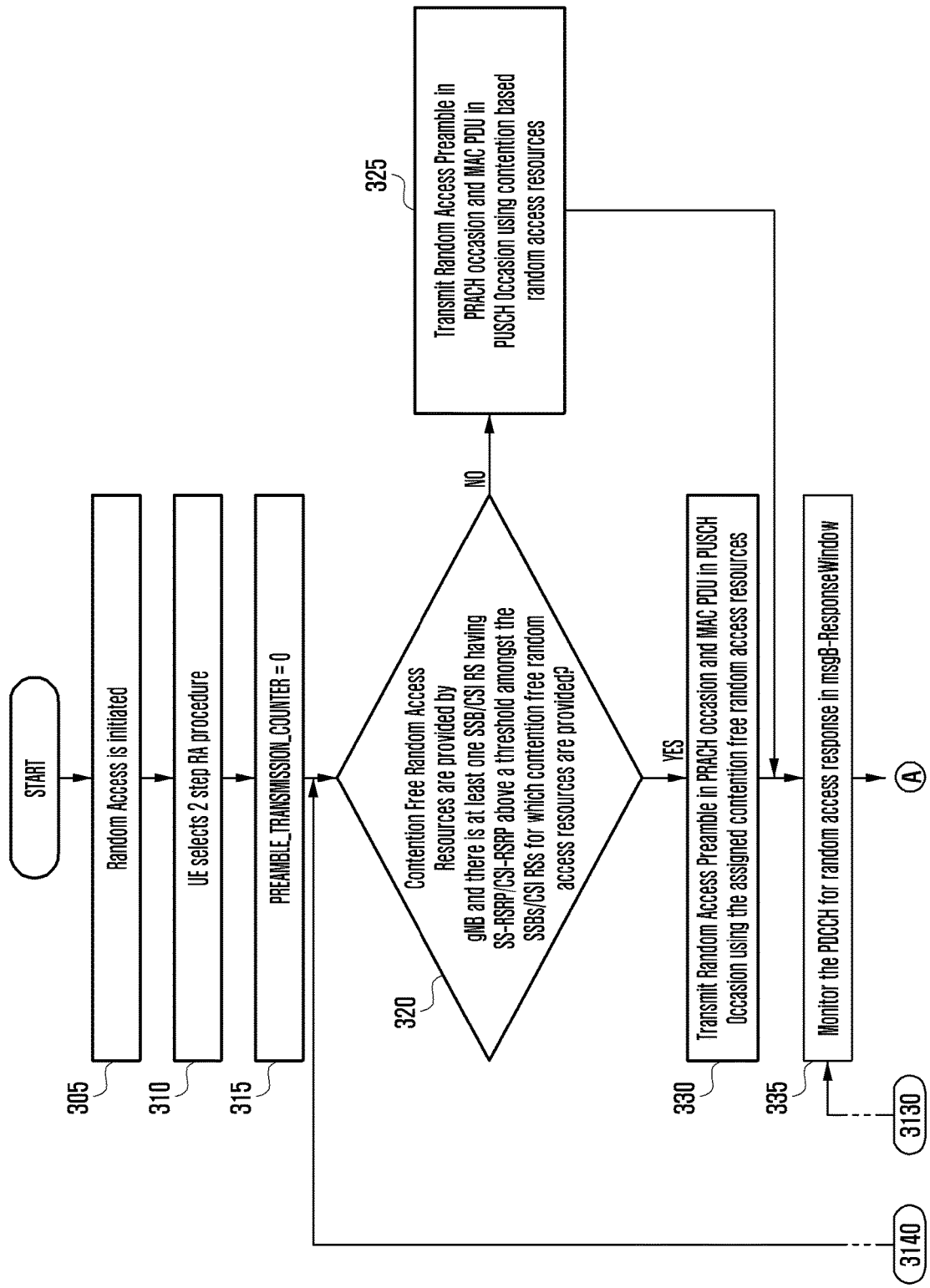
FIGS. 3A, 3B, and 3C illustrate a flowchart of releasing random access resources according to various embodiments of the disclosure.
Figure 3B:
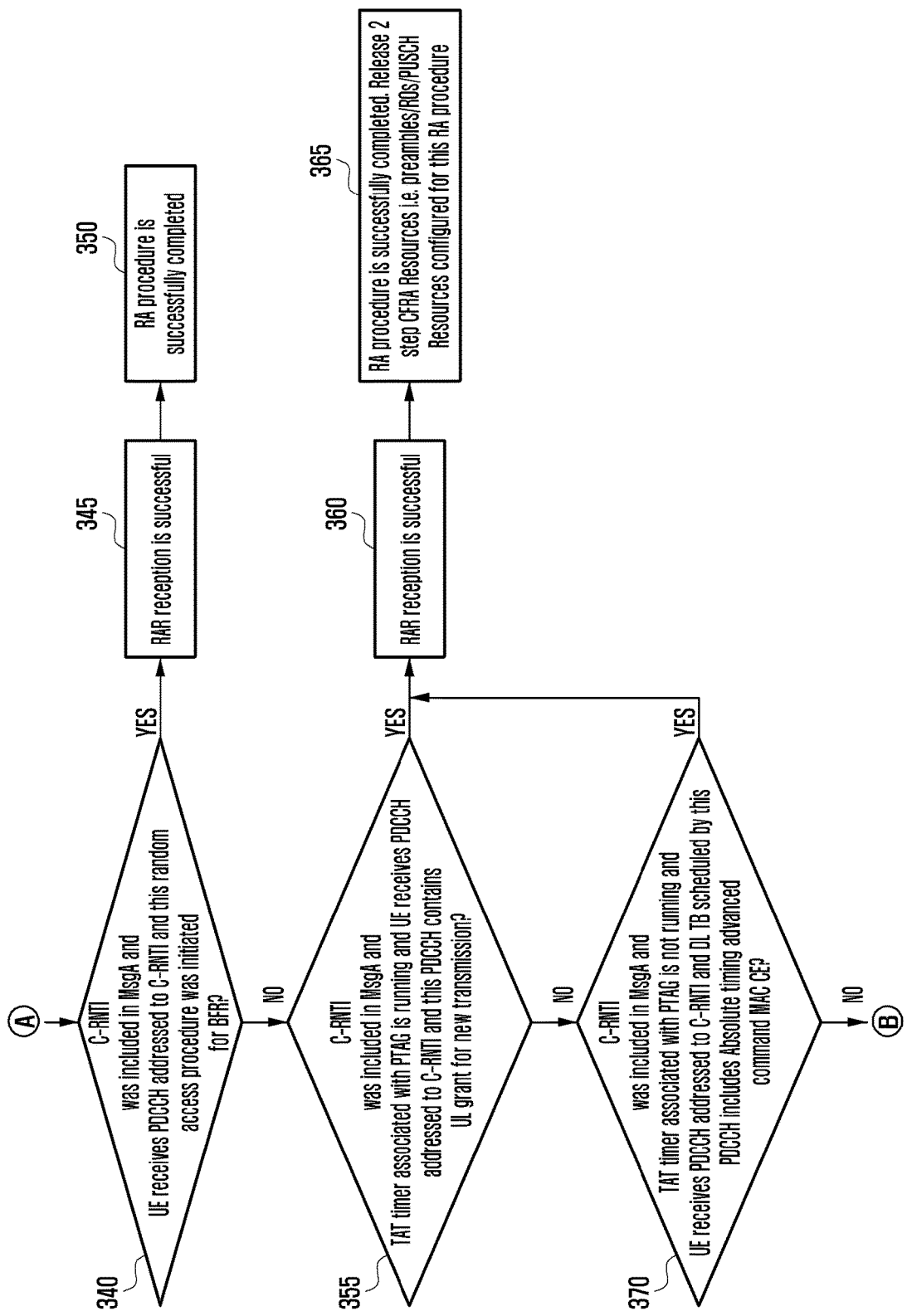
Figure 3C:
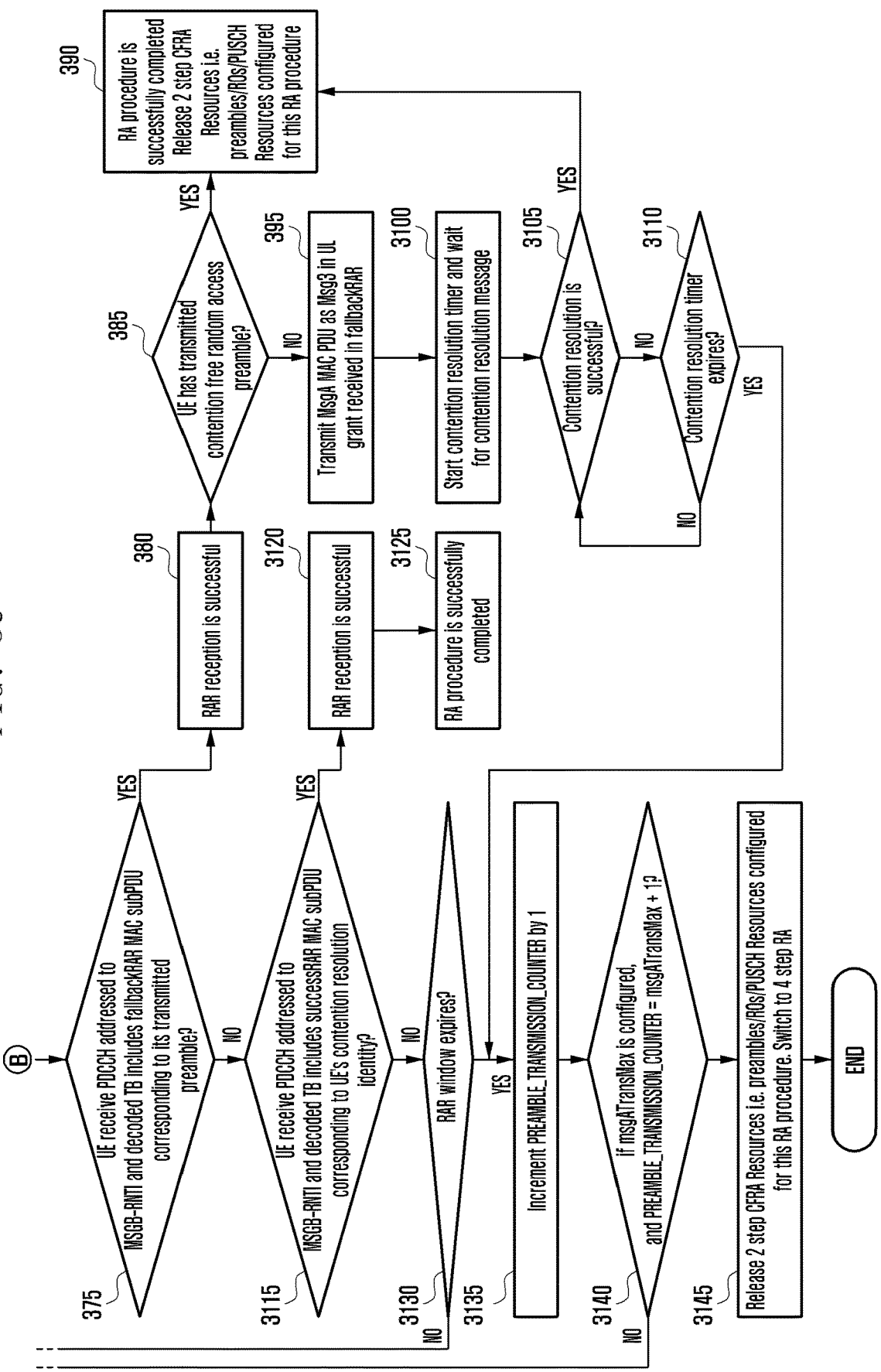

FIGS. 3A, 3B, and 3C illustrate a flowchart of releasing contention free random access resources in for 2 step CFRA resources (i.e., preambles/ROs/PUSCH resources or occasions) configured for the RA procedure according to various embodiments of the disclosure.

Referring to FIG. 3A, a random access procedure is initiated at operation 305s.

Step 0: During the random access procedure initialization, UE first selects the carrier (SUL or NUL). If the carrier to use for the Random Access procedure is explicitly signaled by gNB, UE select the signaled carrier for performing Random Access procedure. If the carrier to use for the Random Access procedure is not explicitly signaled, and if the Serving Cell for the Random Access procedure is configured with supplementary uplink and if the RSRP of the downlink pathloss reference is less than rsrp-Threshold-SSB-SUL, UE select the SUL carrier for performing Random Access procedure. Otherwise, UE select the NUL carrier for performing Random Access procedure.

UL carrier for random access procedure is explicitly signaled by gNB during handover or reconfiguration with sync. If gNB want UE to selected NUL for 2 step RACH, it provides 2 step contention free random access resources for NUL in reconfiguration message. If gNB wants UE to selected SUL for 2 step RACH, it provides 2 step contention free random access resources for SUL in reconfiguration message. If gNB wants UE to selected NUL for 4 step RACH, it provides 4 step contention free random access resources for NUL in reconfiguration message. If gNB wants UE to selected SUL for 4 step RACH, it provides 4 step contention free random access resources for SUL in reconfiguration message.

Upon selecting the UL carrier, UE determines the UL and DL BWP for random access procedure as specified in section 5.15 of TS 38.321.

UE then determine whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

else if 2 step contention free random access resources are signaled by gNB for this random access procedure, UE selects 2 step RACH.

else if 4 step contention free random access resources are signaled by gNB for this random access procedure, UE selects 4 step RACH.

else if the UL BWP selected for this random access procedure is configured with only 2 step RACH resources, UE selects 2 step RACH.

else if the UL BWP selected for this random access procedure is configured with only 4 step RACH resources, UE selects 4 step RACH.

else if the UL BWP selected for this random access procedure is configured with both 2 step and 4 step RACH resources, if RSRP of the downlink pathloss reference is below a configured threshold, UE selects 4 step RACH. Otherwise UE selects 2 step RACH.

Based on the above criteria, UE has selected 2 step RA procedure at operation 310. UE initializes the preamble transmission counter (PREAMBLE_TRANSMISSION_COUNTER) to zero at operation 315.

Step 1: if contention Free Random Access Resources are provided by gNB and there is at least one SSB/CSI RS having SS-RSRP/CSI-RSRP above a threshold amongst the SSBs/CSI RSs for which contention free random access resources are provided at operation 320, UE Transmit Random Access Preamble in PRACH occasion and MAC PDU in PUSCH Occasion using the assigned contention free random access resources at operation 330. Otherwise at operation 320, UE transmit Random Access Preamble in PRACH occasion and MAC PDU in PUSCH Occasion using the contention based random access resources at operation 325.

Step 2: UE then starts msgB-ResponseWindow and monitor the PDCCH for random access response in msgB-ResponseWindow at operation 335. UE monitors the PDCCH of the SpCell for a random access response identified by MSGB-RNTI while the msgB-ResponseWindow is running. If C-RNTI MAC CE was included in the MSGA: UE additionally monitor the PDCCH of the SpCell for random access response identified by the C-RNTI while the msgB-ResponseWindow is running.

Step 3: While msgB-ResponseWindow is running:

Referring to FIG. 3B, if C-RNTI was included in MsgA and UE receives PDCCH addressed to C-RNTI and this random access procedure was initiated for BFR at operation 340: RAR reception is successful at operation 345. RA procedure is successfully completed at operation 350. Go to step 8.

Else If C-RNTI was included in MsgA and TAT timer associated with PTAG is running and UE receives PDCCH addressed to C-RNTI and this PDCCH contains UL grant for new transmission at operation 355, RAR reception is successful at operation 360. RA procedure is successfully completed. UE releases the 2 step CFRA resources (random access preamble(s), RACH occasions, PUSCH resources) configured (if any) for this random access procedure at operation 365. Release here means that UE will not use these resources for subsequent random access procedure. Go to step 8. In an embodiment of the disclosure, release operation may not be performed in this case, as contention free resources may not be configured for the case where PTAG is running and RA is initiated for events other than BFR.

Else If C-RNTI was included in MsgA and TAT timer associated with PTAG is not running and UE receives PDCCH addressed to C-RNTI and DL TB scheduled by this PDCCH includes Absolute timing advanced command MAC CE at operation 370), RAR reception is successful at operation 360. RA procedure is successfully completed. UE releases the 2 step CFRA resources (random access preamble(s), RACH occasions, PUSCH resources) configured (if any) for this random access procedure at operation 365. Go to step 8. Release here means that UE will not use these resources for subsequent random access procedure.

Else If UE receives PDCCH addressed to MSGB-RNTI and decoded TB includes fallbackRAR MAC subPDU corresponding to its transmitted preamble at operation 375: RAR reception is successful at operation 380.

If random access preamble transmitted is contention free random access preamble at operation 385, RA procedure is successfully completed. UE releases the 2 step CFRA resources (random access preamble(s), RACH occasions, PUSCH resources) configured (if any) for this random access procedure at operation 390. Go to step 8. Release here means that UE will not use these resources for subsequent random access procedure.

Else at operation 385

Transmit MsgA MAC PDU as Msg3 in UL grant received in fallbackRAR at operation 395

Start contention resolution timer at operation 3100

Go to step 5

Else If UE receives PDCCH addressed to MSGB-RNTI and decoded TB includes successRAR MAC subPDU corresponding to UE's contention resolution identity (i.e., contention resolution identity received matches the first 48 bits of CCCH SDU transmitted in MsgA) at operation 3115, RAR reception is successful at operation 3120. RA procedure is successfully completed at operation 3125. Go to step 8. Note that this is the case when CCCH SDU is included in MSGA, that is UE is in idle/inactive or performing RRC connection re-establishment. For these cases contention free resources are not configured, so no need to release. In an alternate embodiment of the disclosure, UE releases the 2 step CFRA resources (random access preamble (s), RACH occasions, PUSCH resources) configured (if any) for this random access procedure. Release here means that UE will not use these resources for subsequent random access procedure.

Step 4: If RAR window expires at operation 3130:

Increment preamble transmission counter by 1 at operation 3135.

If msgATransMax is configured, and if PREAMBLE_TRANSMISSION_COUNTER= msgATransMax+1 at operation 3140:

Release 2 step CFRA Resources i.e., preambles/ROs/PUSCH Resources configured (if any) for this RA procedure. Release here means that UE will not use these resources for remaining random access attempts of this random access procedure and will also not use these resources for subsequent random access procedure at operation 3145.

Switch to 4 step RA at operation 3145. Go to step 7.

Else:

go to step 1

Step 5: While contention resolution timer is running:

If the Random Access procedure was initiated for beam failure recovery and the UE receives PDCCH transmission addressed to the C-RNTI, or if the Random Access procedure was initiated by a PDCCH order and the UE receives PDCCH transmission addressed to the C-RNTI, or if the Random Access procedure was initiated by the MAC sublayer itself or by the RRC sublayer and the UE receives PDCCH transmission addressed to the C-RNTI and contains a UL grant for a new transmission: Contention Resolution is successful at operation 3105, RA procedure is successfully completed. Release 2 step CFRA Resources i.e., preambles/ROs/PUSCH Resources configured (if any) for this RA procedure at operation 390. Go to step 8. Release here means that UE will not use these resources for subsequent random access procedure.

Step 6: If contention resolution timer expires at operation 3110:

Increment preamble transmission counter by 1 at operation 3135.

If msgATransMax is configured, and if PREAMBLE_TRANSMISSION_COUNTER= msgATransMax+1 operation 3140:

Release 2 step CFRA Resources i.e., preambles/ROs/PUSCH Resources configured (if any) for this RA procedure. Release here means that UE will not use these resources for remaining random access attempts of this random access procedure and will also not use these resources for subsequent random access procedure at operation 3145.

Switch to 4 operation RA at operation 3145. Go to step 7.

Else:

go to step 1

Step 7: perform 4 step RA. If 4 step CFRA resources are configured, these will be released when RA procedure is completed.

Step 8: Stop.

Embodiment 2

Hereinafter, another embodiment of handling PUSCH Resources upon reconfiguration with sync failure is explained in detail.

UE receives from network (i.e., a base station) RRC reconfiguration message including reconfiguration with sync for a cell group. RRC reconfiguration message can include rach-ConfigDedicated.

UE starts the timer T304 for the corresponding SpCell.
UE synchronizes to the DL of the target SpCell.
UE acquires the MIB of target SpCell, if needed.
UE initiates random access on target SpCell.
Upon successful completion of this random access procedure, T304 is stopped.
If T304 of the MCG expires:
  release dedicated preambles provided in rach-ConfigDedicated if configured,
  release dedicated RACH occasions provided in rach-ConfigDedicated if configured,
  release dedicated PUSCH occasions provided in rach-ConfigDedicated if configured,
  revert back to the UE configuration used in the source PCell,
  initiate the connection re-establishment procedure.
NOTE 1: In the context above, "the UE configuration" includes state variables and parameters of each radio bearer.
  else if T304 of a secondary cell group expires:
  release dedicated preambles provided in rach-ConfigDedicated, if configured,
  release dedicated RACH occasions provided in rach-ConfigDedicated if configured,
  release dedicated PUSCH occasions provided in rach-ConfigDedicated if configured,
  initiate the SCG failure information procedure to report SCG reconfiguration with sync failure, upon which the RRC reconfiguration procedure ends, FIG. 4 is a block diagram of a terminal according to an embodiment of the disclosure.

Figure 4:
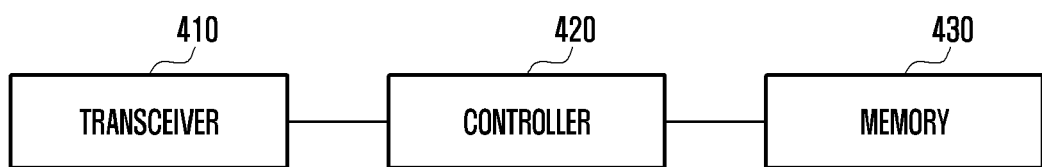
FIG. 4 is a block diagram of a terminal according to an embodiment of the disclosure.

Referring to FIG. 4, a terminal includes a transceiver 410, a controller 420 and a memory 430. The controller 420 may refer to a circuitry, an application-specific integrated circuit (ASIC), or at least one processor. The transceiver 410, the controller 420 and the memory 430 are configured to perform the operations of the UE illustrated in the figures, e.g., FIGS. 1, 2, 3A, 3B, and 3C, or described above. Although the transceiver 410, the controller 420 and the memory 430 are shown as separate entities, they may be realized as a single entity like a single chip. Alternatively, the transceiver 410, the controller 420 and the memory 430 may be electrically connected to or coupled with each other.

The transceiver 410 may transmit and receive signals to and from other network entities, e.g., a base station.

The controller 420 may control the terminal to perform functions according to one of the embodiments described above. For example, the controller 420 controls the transceiver 410 and/or memory 430 to perform random access procedure related operations according to various embodiments of the disclosure.

In an embodiment of the disclosure, the operations of the terminal may be implemented using the memory 430 storing corresponding program codes. Specifically, the terminal may be equipped with the memory 430 to store program codes implementing desired operations. To perform the desired operations, the controller 420 may read and execute the program codes stored in the memory 430 by using at least one processor or a central processing unit (CPU).

Figure 5:
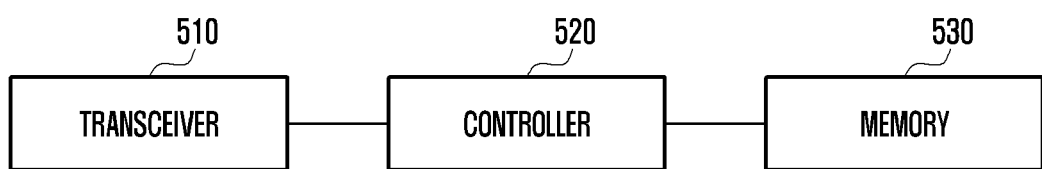
FIG. 5 is a block diagram of a base station according to an embodiment of the disclosure.

FIG. 5 is a block diagram of a base station according to an embodiment of the disclosure.

Referring to FIG. 5, a base station includes a transceiver 510, a controller 520 and a memory 530. The controller 520 may refer to a circuitry, an application-specific integrated circuit (ASIC), or at least one processor. The transceiver 510, the controller 520 and the memory 530 are configured to perform the operations of the UE illustrated in the figures, e.g., FIGS. 1, 2, 3A, 3B, and 3C, or described above. Although the transceiver 510, the controller 520 and the memory 530 are shown as separate entities, they may be realized as a single entity like a single chip. Alternatively, the transceiver 510, the controller 520 and the memory 530 may be electrically connected to or coupled with each other.

The transceiver 510 may transmit and receive signals to and from other network entities, e.g., a terminal.

The controller 520 may control the UE to perform functions according to one of the embodiments described above. For example, the controller 520 controls the transceiver 510 and/or memory 530 to perform random access procedure related operations according to various embodiments of the disclosure.

In an embodiment of the disclosure, the operations of the base station may be implemented using the memory 530 storing corresponding program codes. Specifically, the base station may be equipped with the memory 530 to store program codes implementing desired operations. To perform the desired operations, the controller 520 may read and execute the program codes stored in the memory 530 by using at least one processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
  receiving, from a base station, a message including information configuring a contention free random access resource for 2-step random access procedure, wherein the contention free random access resource for 2-step random access procedure comprises a dedicated random access preamble and a dedicated physical uplink shared channel (PUSCH) resource;
  transmitting, to the base station, a message A (MSGA) preamble for the 2-step random access procedure based on the information;
  identifying whether the 2-step random access procedure is completed;
  releasing the contention free random access resource comprising the dedicated random access preamble and the dedicated PUSCH resource and configured based on the information, in case that the 2-step random access procedure is not completed, a parameter associated with a maximum number of MSGA transmission is configured for the 2-step random access procedure, and a number of transmissions of the MSGA equals the parameters;
  releasing the contention free random access resource comprising the dedicated random access preamble and the dedicated PUSCH resource and configured based on the information, in case that the 2-step random access procedure is completed; and releasing the contention free random access resource comprising the dedicated random access preamble and the dedicated PUSCH resource and configured based on the information, in case that a T304 timer configured based on the message expires.

2. The method of claim 1, wherein the message comprises a radio resource control (RRC) reconfiguration message configuring a reconfiguration with sync.

3. The method of claim 1, wherein the contention free random access resource further includes a dedicated random access channel (RACH) occasion.

4. A method performed by a base station in a wireless communication system, the method comprising:
   transmitting, to a terminal, a message including information configuring a contention free random access resource for 2-step random access procedure, wherein the contention free random access resource for 2-step random access procedure comprises a dedicated random access preamble and a dedicated physical uplink shared channel (PUSCH) resource;
   receiving, from the terminal, a message A (MSGA) preamble for the 2-step random access procedure based on the information; and
   transmitting, to the terminal, a message in response to the MSGA preamble,
   wherein, in case that the 2-step random access procedure is not completed, a parameter associated with a maximum number of MSGA transmission is configured for the 2-step random access procedure, and a number of transmissions of the MSGA equals the parameter, the contention free random access resource comprising the dedicated random access preamble and the dedicated PUSCH resource and configured based on the information is released,
   wherein, in case that the 2-step random access procedure is completed, the contention free random access resource comprising the dedicated random access preamble and the dedicated PUSCH resource and configured based on the information is released, and
   wherein, in case that a T304 timer configured based on the message expires, the contention free random access resource comprising the dedicated random access preamble and the dedicated PUSCH resource and configured based on the information is released.

5. The method of claim 4, wherein the message comprises a radio resource control (RRC) reconfiguration message configuring a reconfiguration with sync.

6. The method of claim 4, wherein the contention free random access resource further includes a dedicated random access channel (RACH) occasion.

7. A terminal in a wireless communication system, the terminal comprising:
   a transceiver configured to transmit or receive a signal; and
   a controller configured to:
      receive, from a base station, a message including information configuring a contention free random access resource for 2-step random access procedure, wherein the contention free random access resource for 2-step random access procedure comprises a dedicated random access preamble and a dedicated physical uplink shared channel (PUSCH) resource,
      transmit, to the base station, a message A (MSGA) preamble for the 2-step random access procedure based on the information,
      identify whether the 2-step random access is completed,
      release the contention free random access resource comprising the dedicated random access preamble and the dedicated PUSCH resource and configured based on the information, in case that the 2-step random access is not completed, a parameter associated with a maximum number of MSGA transmission is configured for the 2-step random access procedure, and a number of transmissions of the MSGA equals the parameter,
      release the contention free random access resource comprising the dedicated random access preamble and the dedicated PUSCH resource and configured based on the information, in case that the 2-step random access procedure is completed, and
      release the contention free random access resource comprising the dedicated random access preamble and the dedicated PUSCH resource and configured based on the information, in case that a T304 timer configured based on the message expires.

8. The terminal of claim 7, wherein the message comprises a radio resource control (RRC) reconfiguration message configuring a reconfiguration with sync.

9. The terminal of claim 7, wherein the contention free random access resource further includes a dedicated random access channel (RACH) occasion.

10. A base station in a wireless communication system, the base station comprising:
    a transceiver configured to transmit or receive a signal; and
    a controller configured to:
       transmit, to a terminal, a message including information configuring a contention free random access resource for 2-step random access procedure, wherein the contention free random access resource for 2-step random access procedure comprises a dedicated random access preamble and a dedicated physical uplink shared channel (PUSCH) resource,
       receive, from the terminal, a message A (MSGA) preamble for the 2-step random access procedure based on the information, and
       transmit, to the terminal, a message in response to the MSGA preamble,
    wherein, in case that the 2-step random access procedure is not completed, a parameter associated with a maximum number of MSGA transmission is configured for the 2-step random access procedure, and a number of transmissions of the MSGA equals the parameter, the contention free random access resource comprising the dedicated random access preamble and the dedicated PUSCH resource and configured based on the information is released,
    wherein, in case that the 2-step random access procedure is completed, the contention free random access resource comprising the dedicated random access preamble and the dedicated PUSCH resource and configured based on the information is released, and
    wherein, in case that a T304 timer configured based on the message expires, the contention free random access resource comprising the dedicated random access preamble and the dedicated PUSCH resource and configured based on the information is released.

11. The base station of claim 10, wherein the message comprises a radio resource control (RRC) reconfiguration message configuring a reconfiguration with sync.

12. The base station of claim 10, wherein the contention free random access resource further includes a dedicated random access channel (RACH) occasion.

* * * * *

UNITED STATES PATENT AND TRADEMARK OFFICE
CERTIFICATE OF CORRECTION

| | |
|---|---|
| PATENT NO. | : 11,419,145 B2 |
| APPLICATION NO. | : 17/109599 |
| DATED | : August 16, 2022 |
| INVENTOR(S) | : Anil Agiwal |

Page 1 of 1

It is certified that error appears in the above-identified patent and that said Letters Patent is hereby corrected as shown below:

In the Claims

In Claim 1 at Column 20, Line 56, "resource and configured" should read --resource configured--.

In Claim 1 at Column 20, Line 65, "resource and configured" should read --resource configured--.

In Claim 1 at Column 21, Line 3, "resource and configured" should read --resource configured--.

In Claim 4 at Column 21, Line 33, "resource and configured" should read --resource configured--.

In Claim 4 at Column 21, Lines 38-39, "resource and configured" should read --resource configured--.

In Claim 4 at Column 21, Lines 43-44, "resource and configured" should read --resource configured--.

In Claim 7 at Column 22, Line 3, "resource and configured" should read --resource configured--.

In Claim 7 at Column 22, Line 12, "resource and configured" should read --resource configured--.

In Claim 7 at Column 22, Line 17, "resource and configured" should read --resource configured--.

In Claim 10 at Column 22, Line 52, "resource and configured" should read --resource configured--.

In Claim 10 at Column 22, Lines 57-58, "resource and configured" should read --resource configured--.

In Claim 10 at Column 22, Lines 62-63, "resource and configured" should read --resource configured--.

Signed and Sealed this
Twenty-fifth Day of October, 2022

*Katherine Kelly Vidal*

Katherine Kelly Vidal
*Director of the United States Patent and Trademark Office*